(12) United States Patent
Fujii

(10) Patent No.: US 6,334,090 B1
(45) Date of Patent: Dec. 25, 2001

(54) GPS TERMINAL, POSITION MEASURING SYSTEM, AND MAP DISPLAY METHOD USING THE SAME

(75) Inventor: Tomohiro Fujii, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/642,686

(22) Filed: Aug. 22, 2000

(30) Foreign Application Priority Data

Aug. 24, 1999 (JP) .................................................. 11-236947

(51) Int. Cl.⁷ .............................. G06F 165/00; G01S 5/14
(52) U.S. Cl. ......................... 701/213; 701/212; 340/990
(58) Field of Search ............................... 701/213, 208, 701/211, 212, 200; 73/178 R; 340/990, 991, 993

(56) References Cited

U.S. PATENT DOCUMENTS

| | | | |
|---|---|---|---|
| 4,809,005 | * 2/1989 | Counselman, III | 342/352 |
| 5,617,319 | * 4/1997 | Arakawa et al. | 701/207 |
| 5,699,056 | * 12/1997 | Yoshida | 340/905 |
| 5,752,219 | 5/1998 | Yoshihara et al. | 701/213 |
| 5,754,136 | * 5/1998 | Kojima et al. | 342/357 |
| 5,867,110 | * 2/1999 | Naito et al. | 340/995 |
| 5,889,493 | 3/1999 | Endo | 342/357 |
| 5,938,719 | * 8/1999 | Arakawa et al. | 701/207 |
| 6,122,592 | * 9/2000 | Arakawa et al. | 701/201 |

FOREIGN PATENT DOCUMENTS 2905662 3/1999 (JP) .

* cited by examiner

*Primary Examiner*—William A. Cuchlinski, Jr.
*Assistant Examiner*—Olga Hernandez
(74) *Attorney, Agent, or Firm*—Sughrue Mion, PLLC

(57) ABSTRACT

A GPS terminal includes a reception section, control section, and display section. The reception section is equipped with a GPS and receives radio signals transmitted from a plurality of artificial satellites. The control section recognizes the latitude/longitude data of the current position on the basis of the radio signals received by the reception section. The display section displays a map centered on the latitude/longitude data recognized by the control section. The reception section measures reception sensitivity with respect to the radio signals transmitted from the artificial satellites. The control section automatically changes the scale of the map displayed by the display section on the basis of the measurement result on the reception sensitivity in the reception section with respect to the radio signals. A position measuring system and map display method are also disclosed.

18 Claims, 9 Drawing Sheets

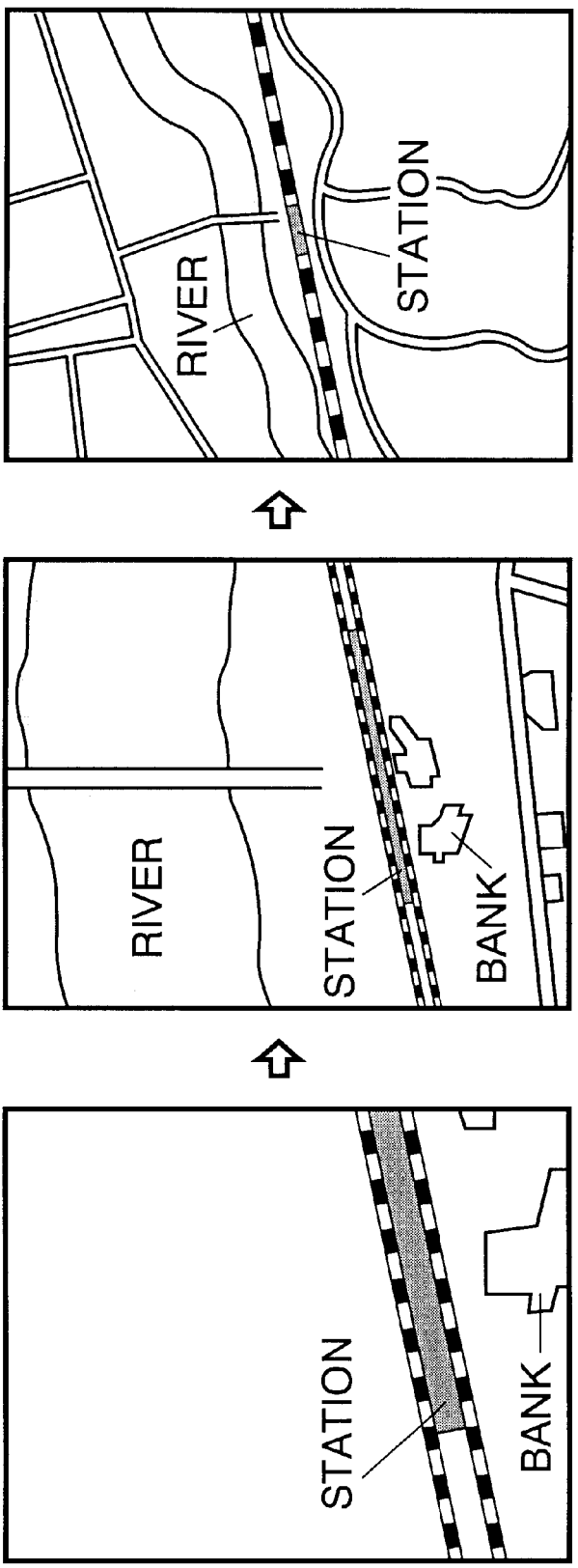

GPS TERMINAL, POSITION MEASURING SYSTEM, AND MAP DISPLAY METHOD USING THE SAME

BACKGROUND OF THE INVENTION

1. Field of the Invention

The present invention relates to a GPS terminal and position measuring system which measure the current position of an object by using a GPS (Global Positioning System) and display a map centered on the measured position, and a map display method using them and, more particularly, to a GPS terminal and position measuring system which can automatically change the sale of a map to be displayed, and a map display method using them.

2. Description of the Prior Art

As a system for measuring the current position of a moving object such as a vehicle, a position measuring system called a GPS is widely used, in which a moving object receives radio signals from a plurality of (three or more in general) artificial satellites and measures the current position of the moving object by using the received radio signals.

In a position measuring system using a GPS, map data is stored in a GPS-equipped GPS terminal in advance, and a map centered on the measured position is displayed on the screen of the GPS terminal, thereby allowing the user recognize the current position of the GPS terminal.

Of position measuring systems using GPSs, a network-dependent position measuring system in which each GPS terminal is equipped with a network-dependent GPS to measure the current position of the GPS terminal by using network communication has become popular, as compared with a conventional position measuring system in which each GPS terminal is used singly.

In comparison with a general GPS terminal using a GPS singly, a GPS terminal equipped with a network-dependent GPS exhibits high reception sensitivity with respect to radio signals from artificial satellites and a short communication establishment time for artificial satellites because of accurate calculation of position information on the network side.

According to such a GPS terminal equipped with a network-dependent GPS, when the reception sensitivity level with respect to radio signals from artificial satellites is high, the position of the GPS terminal can be recognized with a precision of several m. When, however, the reception sensitivity level is low, e.g., the GPS terminal is influenced by a multi-path effect between buildings, in a room, or the like, or the network is disconnected, the recognition precision of the position of the GPS terminal deteriorates to several hundred m.

In a general GPS terminal using a GPS singly, while the reception sensitivity level is low, the terminal cannot establish communication with any artificial satellite before deterioration in position recognition precision., and hence the position cannot be quickly recognized.

If, therefore, the reception sensitivity level with respect to radio signals from artificial satellites drops and the position recognition precision deteriorates while a map is displayed on the screen at a small reduction ratio, an accurate map may not be displayed on the screen. Then, the user of the GPS terminal may erroneously recognize the current position more often.

SUMMARY OF THE INVENTION

The present invention has been made in consideration of the above problems in the prior art, and has as its object to provide a GPS terminal and position measuring system which can reduce the possibility that the user of the GPS terminal may erroneously recognize the current position when the reception sensitivity in the GPS terminal deteriorates and position recognition precision deteriorates, and a map display method using them.

In order to achieve the above object, according to the first aspect of the present invention, there is provided a GPS terminal comprising reception means, equipped with a GPS, for receiving radio signals transmitted from a plurality of artificial satellites, control means for recognizing latitude/longitude data of a current position on the basis of the radio signals received by the reception means, and display means for displaying a map centered on the latitude/longitude data recognized by the control means, wherein the reception means measures reception sensitivity with respect to the radio signals transmitted form the plurality of artificial satellites, and the control means automatically changes a scale of the map displayed by the display means on the basis of the measurement result on the reception sensitivity in the reception means with respect to the radio signals.

According to the second aspect of the present invention, there is provided a GPS terminal comprising reception means, equipped with a GPS capable of network communication, for receiving radio signals transmitted from a plurality of artificial satellites, communication means for receiving latitude/longitude data of a current position by network communication with a base station, control means for recognizing the latitude/longitude data of the current position on the basis of the radio signals received by the reception means and the latitude/longitude data received by the communication means, and display means for displaying a map centered on the latitude/longitude data recognized by the control means, wherein the reception means measures reception sensitivity with respect to the radio signals transmitted from the plurality of artificial satellites, and the control means automatically changes a scale of the map displayed by the display means on the basis of the measurement result on the reception sensitivity in the reception means with respect to the radio signals.

According to the third aspect of the present invention, in the GPS terminal according to one of the first and second aspects, the reception means measures reception sensitivity with respect to radio signals transmitted from the plurality of artificial satellites upon reception of a request to scale down the map displayed by the display means, and the control means automatically changes the scale of the map displayed by the display means on the basis of the measurement result on the reception sensitivity in the reception means with respect to the radio signals.

According to the fourth aspect of the present invention, in the GPS terminal according to any one of the first to third aspects, the terminal further comprises storage means for storing a wide-area map in advance, and the control means displays the wide-area map stored in the storage means upon changing a scale of the wide-area map on the basis of the measurement result in the reception means with respect to the radio signals.

According to the fifth aspect of the present invention, in the second or third aspect, the control means accesses the Internet through the communication means and the base station, downloads a map whose scale is changed from a map server on the Internet on the basis of the measurement result on the reception sensitivity in the reception means with respect to the radio signals, and displays the map on the display means.

According to the sixth aspect of the present invention, there is provided a position measuring system comprising a base station which is equipped with a GPS capable of network communication and receives radio signals transmitted from a plurality of artificial satellites, and a GPS terminal which is equipped with a GPS capable of network communication, receives radio signals transmitted from the plurality of artificial satellites, recognizes latitude/longitude data of a current position by performing network communication with the base station, and displays a map centered on the latitude/longitude data, wherein the GPS terminal measures reception sensitivity with respect to the radio signals transmitted from the plurality of artificial satellites, and automatically changes a scale of the displayed map on the basis of the measurement result.

According to the seventh aspect of the present invention, in the position measuring system according to the sixth aspect, the GPS terminal comprises:
reception means for receiving radio signals transmitted from a plurality of artificial satellites and measuring reception sensitivity with respect to the radio signals transmitted from the plurality of artificial satellites;
communication means for receiving latitude/longitude data of a current position of the GPS terminal by performing network communication with the base station;
control means for recognizing the latitude/longitude data of the current position on the basis of the radio signals received by the reception means and the latitude/longitude data received by the communication means; and
display means for displaying a map centered on the latitude/longitude data recognized by the control means, and
the control means automatically changes a scale of the map displayed by the display means on the basis of the measurement result in the reception means with respect to the radio signals.

According to the eighth aspect of the present invention, in the position measuring system according to the seventh aspect, the reception means measures reception sensitivity with respect to radio signals transmitted from the plurality of artificial satellites upon reception of a request to scale down the map displayed by the display means, and
the control means automatically changes the scale of the map displayed by the display means on the basis of the measurement result on the reception sensitivity in the reception means with respect to the radio signals.

According to the ninth aspect of the present invention, there is provided a position measuring system comprising a base station which is equipped with a GPS capable of network communication and receives radio signals transmitted from a plurality of artificial satellites, and a GPS terminal which is equipped with a GPS capable of network communication, receives radio signals transmitted from the plurality of artificial satellites, recognizes latitude/longitude data of a current position by performing network communication with the base station, and displays a map centered on the latitude/longitude data, wherein the base station measures reception sensitivity in the GPS terminal with respect to the radio signals transmitted from the plurality of artificial satellites, and transmits the measurement result to the GPS terminal, and the GPS terminal automatically changes a scale of the displayed map on the basis of the measurement result on the reception sensitivity in the GPS terminal with respect to the radio signals, which is transmitted from the bass station.

According to the 10th aspect of the present invention, the GPS terminal according to the ninth aspect the GPS terminal comprises:
reception means for receiving radio signals transmitted from a plurality of artificial satellites;
communication means for receiving latitude/longitude data of a current position of the GPS terminal by performing network communication with the base station;
control means for recognizing the latitude/longitude data of the current position on the basis of the radio signals received by the reception means and the latitude/longitude data received by the communication means;
display means for displaying a map centered on the latitude/longitude data recognized by the control means,
the communication means receives the measurement result on the reception sensitivity in the reception means with respect to the radio signals, which is transmitted from the base station, and
the control means automatically changes the scale of the map displayed by the display means on the basis of the measurement result on the reception sensitivity in the reception means with respect to the radio signals, which is received by the communication means.

According to the 11th aspect of the present invention, in the 10th aspect, the communication means receives the measurement result on the reception sensitivity in the reception means with respect to the radio signals from the plurality of artificial satellites, which is transmitted from the base station, upon reception of a request to scale down the map displayed by the display means, and
the control means automatically changes the scale of the map displayed by the display means on the basis of the measurement result on the reception sensitivity in the reception means with respect to the radio signals, which is received by the communication means.

According to the 12th aspect of the present invention, in any one of the seventh, eighth, 10th, and 11th aspects, the GPS terminal further comprises storage means for storing a wide-area map in advance, and
the control means displays the wide-area map stored in the storage means upon changing a scale of the wide-area map on the basis of the measurement result on the reception sensitivity in the reception means with respect to the radio signals transmitted from the plurality of artificial satellites.

According to the 13th aspect of the present invention, in the position measuring system according to any one of the seventh, eighth, 10th, and 11th aspects, the control means accesses the Internet through the communication means and the base station, downloads a map whose scale is changed from a map server on the Internet on the basis of the measurement result on the reception sensitivity in the reception means with respect to the radio signals transmitted from the plurality of artificial satellites, and displays the map on the display means.

According to the 14th aspect of the present invention, there is provided a map display method using the GPS terminal according to the fourth aspect, comprising the steps of:

causing the reception means to measure reception sensitivity with respect to radio signals transmitted from the plurality of artificial satellites upon reception of a request to scale down the map displayed by the display means; and causing the control means to display the wide-area map stored in the storage means upon changing the scale of the map on the basis of the measurement result on the reception sensitivity in the reception means with respect to the radio signals.

According to the 15th aspect of the present invention, there is provided a map display method using the GPS terminal according to the fifth aspect, comprising the steps of:

causing the reception means to measure reception sensitivity with respect to radio signals transmitted from the plurality of artificial satellites upon reception of a request to scale down the map displayed by the display means; and causing the control means to access the Internet through the communication means and the base station, download a map whose scale is changed from a map server on the Internet on the basis of the measurement result on the reception sensitivity in the reception means with respect to the radio signals, and display the map on the display means.

According to the 16th aspect of the present invention, there is provided a map display method using the position measuring system according to the 12th aspect, comprising the step of causing the control means to display the wide-area map stored in the storage means upon changing the scale of the map on the basis of the measurement result on the reception sensitivity in the reception means with respect to the radio signals transmitted from the plurality of artificial satellites.

According to the 17th aspect of the present invention, there is provided a map display method using the position measuring system according to the 13th aspect, comprising the step of causing the control means to access the Internet through the communication means and the base station, download a map whose scale is changed from a map server on the Internet on the basis of the measurement result on the reception sensitivity in the reception means with respect: to the radio signals transmitted from the plurality of artificial satellites, and display the map on the display means.

In the present invention having the above arrangement according to the respective aspects, reception sensitivity in the GPS terminal with respect to radio signals transmitted from artificial satellites is measured, and the scale of a map displayed on the GPS terminal is automatically changed on the basis of the measurement result.

If, therefore, the position recognition precision of the GPS terminal deteriorates, the scale of a map displayed on the GPS terminal is automatically decreases, thereby reducing the possibility that the user of the GPS terminal may erroneously recognize the current position.

In addition, the user can improve the position recognition precision of the GPS terminal by changing, for example, the reception condition for radio signals in the GPS terminal.

The above and many other objects, features and advantages of the present invention will become manifest to those skilled in the art upon making reference to the following detailed description and accompanying drawings in which preferred embodiments incorporating the principle of the present invention are shown by way of illustrative examples.

BRIEF DESCRIPTION OF THE DRAWINGS

FIGS. 6A and 6B show images each shown when the display area on the LCD in FIG. 5 is expanded on the basis of the reception sensitivity in the GPS terminal with respect to radio signals transmitted from GPS satellites, in which FIG. 6A is a view showing an image when the display area is expanded to display an area B in FIG. 5, and FIG. 6B is a view showing an image when the display area is expanded to display an area C in FIG. 5:

FIGS. 7A to 7C are views each showing an image window that is actually displayed on the display area on the LCD in the GPS terminal in FIG. 2, with the image windows shown in FIGS. 7A, 7B, and 7C having decreasing reception sensitivity in the GPS terminal with respect to radio signals transmitted from GPS satellites in this order;

DETAILED DESCRIPTION OF THE PREFERRED EMBODIMENTS

A few preferred embodiments of the present invention will be described below with reference to the accompanying drawings.

First Embodiment

Figure 1:
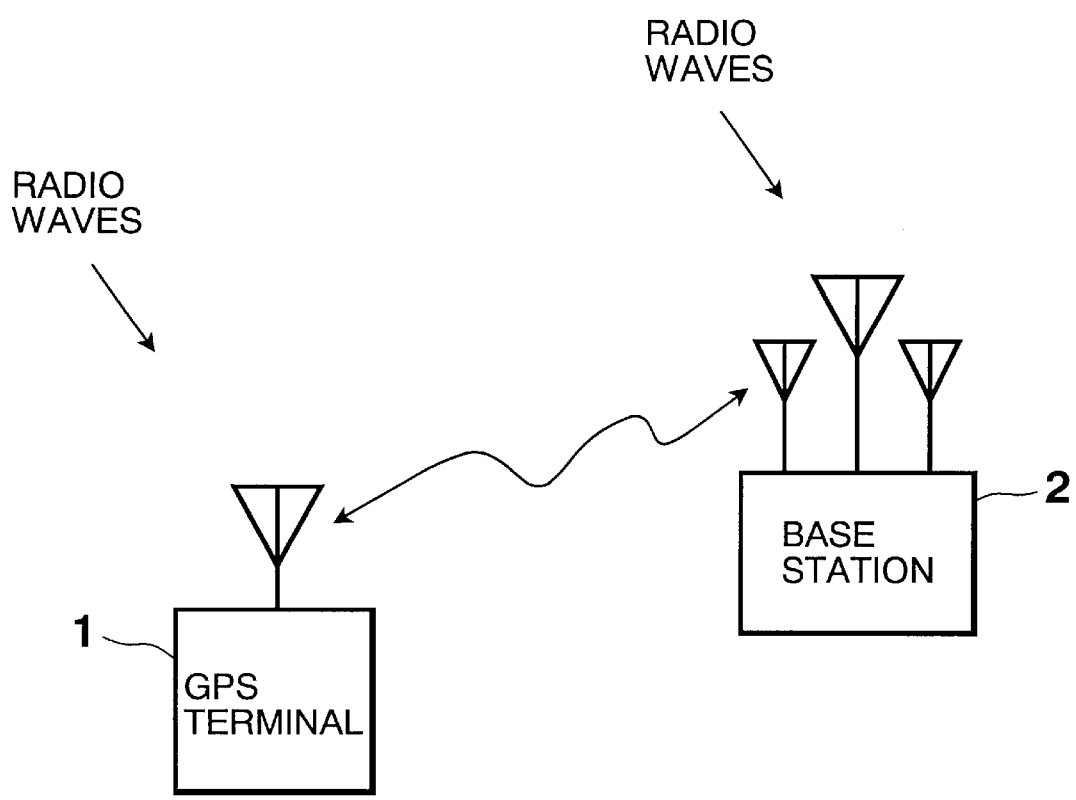
FIG. 1 is a schematic view showing the arrangement of a position measuring system according to the first embodiment of the present invention.

FIG. 1 is a view showing a position measuring system using a GPS terminal according to the first embodiment of the present invention.

As shown in FIG. 1, the first embodiment includes a base station (position information server center) 2 which is equipped with a network-dependent GPS and receives GPS radio signals from a plurality of GPS satellites (not shown) as artificial satellites, and a GPS terminal 1 which is equipped with a network-dependent GPS, receives GPS radio signals from a plurality of GPS satellites, and transmits the received radio signals to the base station 2. In the base station 2, the latitude/longitude data of the current position of the GPS terminal 1 is calculated on the basis of the radio signals in the base station 2 which are transmitted from the GPS satellites and the radio signals in the GPS terminal 1 which are transmitted from the GPS terminal 1. The calculated latitude/longitude data is transmitted to the GPS terminal 1.

In this position measuring system, the GPS terminal 1 need not calculate accurate position information such as latitude/longitude data, but the base station 2 calculates all the position information of the GPS terminal 1. In comparison with a position measuring system using each GPS terminal singly, the satellite communication establishment time is short, and the reception sensitivity is high. Note that such a position measuring system is a known technique.

On the GPS terminal 1, a map centered on the latitude/longitude data of the GPS terminal 1, calculated in the base station 2, is displayed as a wide-area map on a built-in LCD. In addition, the reception sensitivity with respect to the radio signals in the GPS terminal 1 is measured on the basis of the electric field strength of radio signals transmitted from the GPS satellites. The scale of the wide-area map displayed on the LCD is changed on the basis of the measurement result.

In the first embodiment the base station 2 may be designed to measure reception sensitivity with respect to radio signals in the GPS terminal 1.

Figure 2:
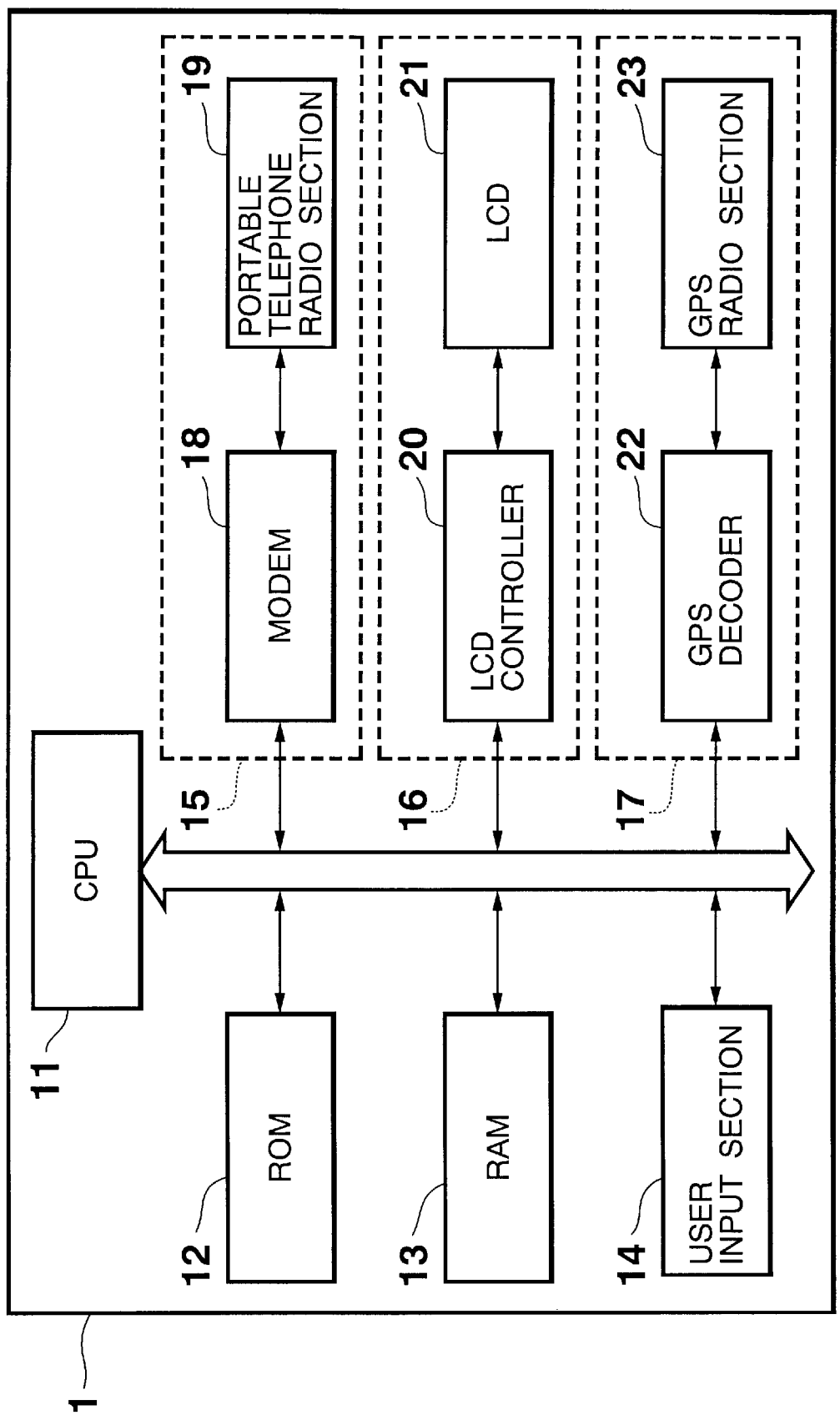
FIG. 2 is a block diagram showing an example of a GPS terminal in FIG. 1.

FIG. 2 is a view showing an example of the arrangement of the GPS terminal 1 in FIG. 1.

As shown in FIG. 2, the GPS terminal 1 is comprised of a GPS block 17 serving as a reception means for receiving radio signals transmitted from GPS satellites and measuring reception sensitivity with respect to the radio signals in the GPS terminal 1 on the basis of the electric field strength of the received radio signals, a communication block 15 serving as communication means for transmitting the radio signals received at the .GPS block 17 to the base station 2, and receiving the latitude/longitude data of the GPS terminal 1 from the base station 2, a CPU 11 serving as a control means for controlling the overall terminal, a ROM 12 serving as a storage means storing control programs for the CPU 11, map data, and the like, a RAM 13 used as a work area of the CPU 11, a display block 16 serving as a display means for displaying a map centered on the latitude/longitude data of the GPS terminal 1, received by the communication block 15, in accordance with an instruction from the CPU 11, and a user input section 14 to which user information such as an instruction about a method of displaying a map on the display block 16 is input. When user information requesting a reduction in the scale of the map displayed on the display block 16 is input to the user input section 14, the CPU 11 determines the reduction ratio of the map displayed on the display block 16 on the basis of the reception sensitivity with respect to radio signals which is measured by the GPS block 17. The display block 16 displays the map upon changing its scale according to the reduction ratio determined by the CPU 11.

The communication block 15 is comprised of a portable telephone radio section 19 for communicating data such as position information with the base station 2 or the Internet connected to the base station 2 by using a portable telephone network in accordance with an instruction from the CPU 11, and a modem 18 for performing, for example conversion of data for communication performed by the portable telephone radio section 19.

The GPS block 17 is comprised of a GPS radio section 23 for receiving radio signals transmitted from GPS satellites and measuring reception sensitivity on the basis of the electric field strength of the radio signals, and a GPS decoder 22 for decoding the radio signals received by the GPS radio section 23.

The display block 16 is comprised of an LCD 21 for displaying a map and the like, and an LCD controller 20 for changing the scale of a map displayed on the LCD 21 on the basis of an instruction from the CPU 11.

The CPU 11 determines the reduction ratio of a map displayed on the LCD 21 on the basis of the measurement result on the reception sensitivity with respect to radio signals in the GPS radio section 23, and provides the LCD controller 20 with an instruction about the determined reduction ratio.

The RAM 13 stores the latitude/longitude data of the GPS terminal 1, which is transmitted from the base station 2 and received by the communication block 15.

Map display operation in the GPS terminal having the above arrangement will be described in detail below with reference to the flow chart of FIG. 3.

Figure 3:
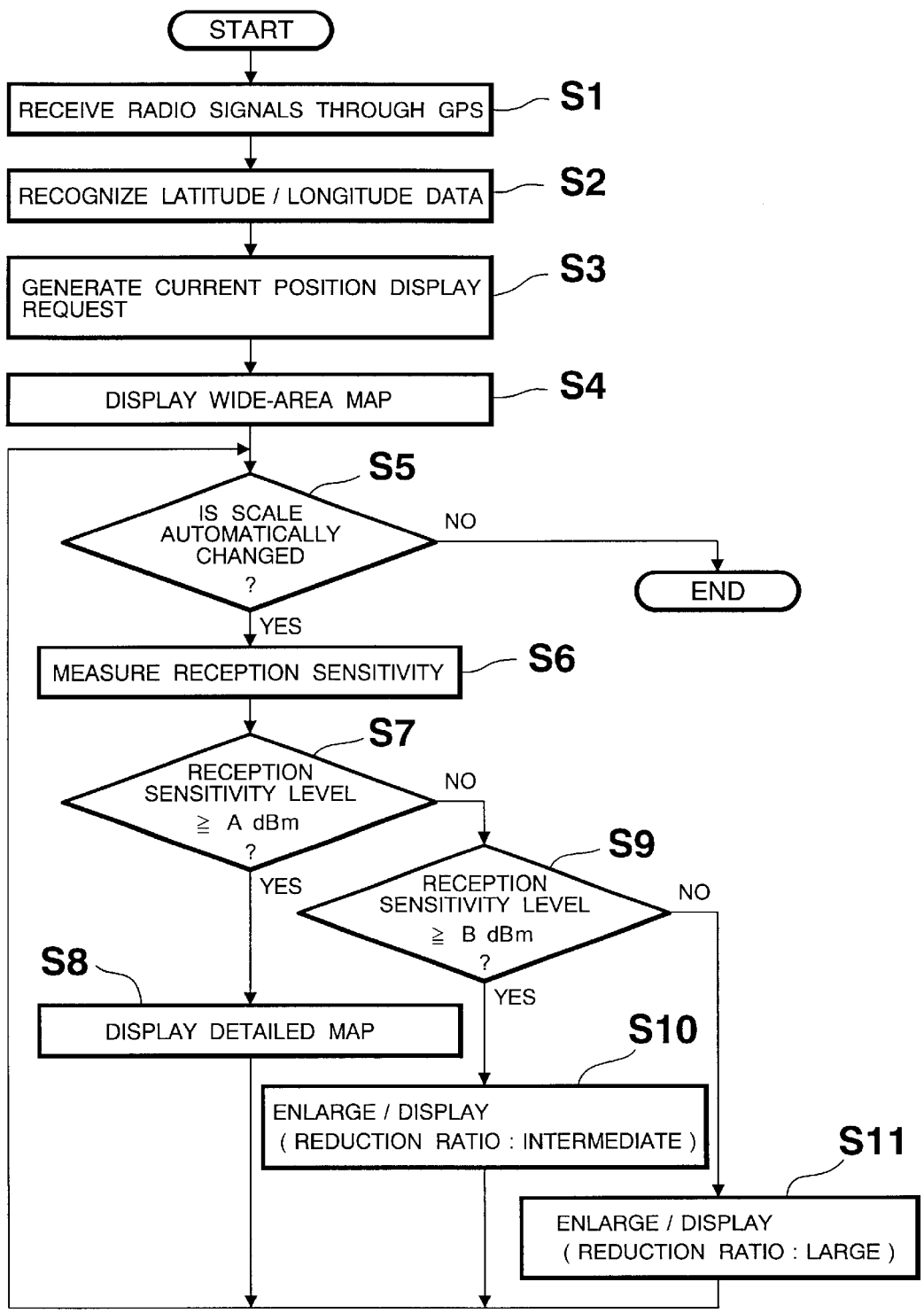
FIG. 3 is a flow chart for explaining the map display operation of the GPS terminal used in the first embodiment of the present invention.

FIG. 3 is a flow chart for explaining the map display operation of the GPS terminal shown in FIGS. 1 and 2. Assume that a map is displayed on the LCD at one of three different reduction ratios on the basis of the reception sensitivity in the GPS terminal with respect to radio signals transmitted from GPS satellites. If the reception sensitivity is equal to or more than A [dBm (absolute, value)], the map is displayed at the smallest reduction ratio. When the reception sensitivity is in the range of [dBm]

(inclusive) to A [dBm] (exclusive), the map is displayed at an intermediate reduction ratio. When the reception sensitivity is less than B [dBm], the map is displayed at the largest reduction ratio.

First of all, the GPS radio section 23 in the GPS terminal 1 receives radio signals transmitted from GPS satellites (step S1). At this time, the base station 2 also receives the radio signals transmitted from the GPS satellites.

The radio signals received by the GPS radio section 23 are decoded by the GPS decoder 22. The resultant data is then transmitted to the base station 2 through the modem 18 and portable telephone radio section 19.

The base station 2 calculates the latitude/longitude data of the GPS terminal 1 on the basis of the radio signals in the base station 2, which are transmitted from the GPS satellites, and the radio signals in the GPS terminal 1, which are transmitted from the GPS terminal 1. Thereafter, the calculated latitude/longitude data is transmitted from the base station 2 to the GPS terminal 1 (step S2).

The latitude/longitude data transmitted from the base station 2 to the GPS terminal 1 is transmitted to the CPU 11 through the modem 18 and portable telephone radio section 19. The CPU 11 then recognizes the latitude/longitude data of the GPS terminal 1.

When a request to display the current position is input to the user input section 14 (step S3), the CPU 11 reads out a wide-area map centered on the recognized latitude/longitude data of the GPS terminal 1 from the bit-mapped map data stored in the ROM 12.

Figure 4:
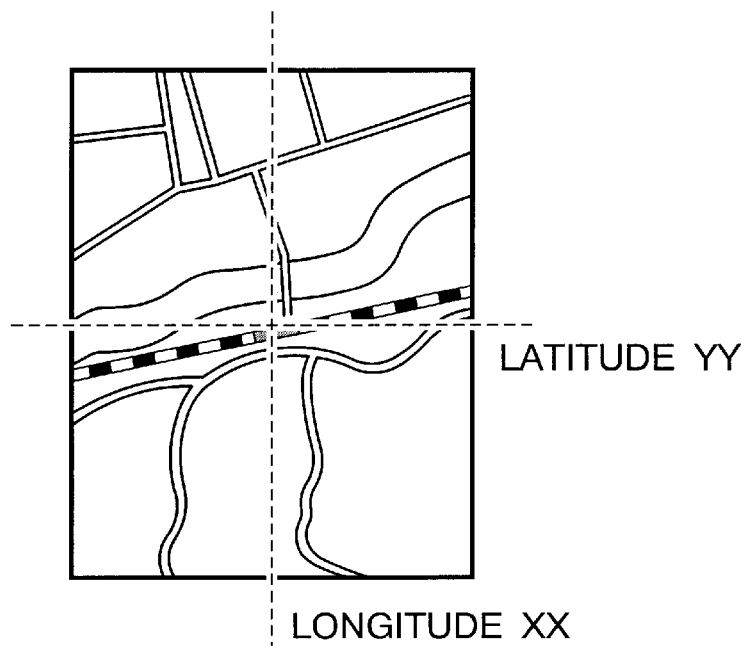
FIG. 4 is a view showing a wide-area map read out from a ROM in the GPS terminal in FIG. 3.

FIG. 4 is a view showing an example of the map data read out from the ROM 12 in the GPS terminal 1 shown in FIGS. 1 and 2.

Figure 9:
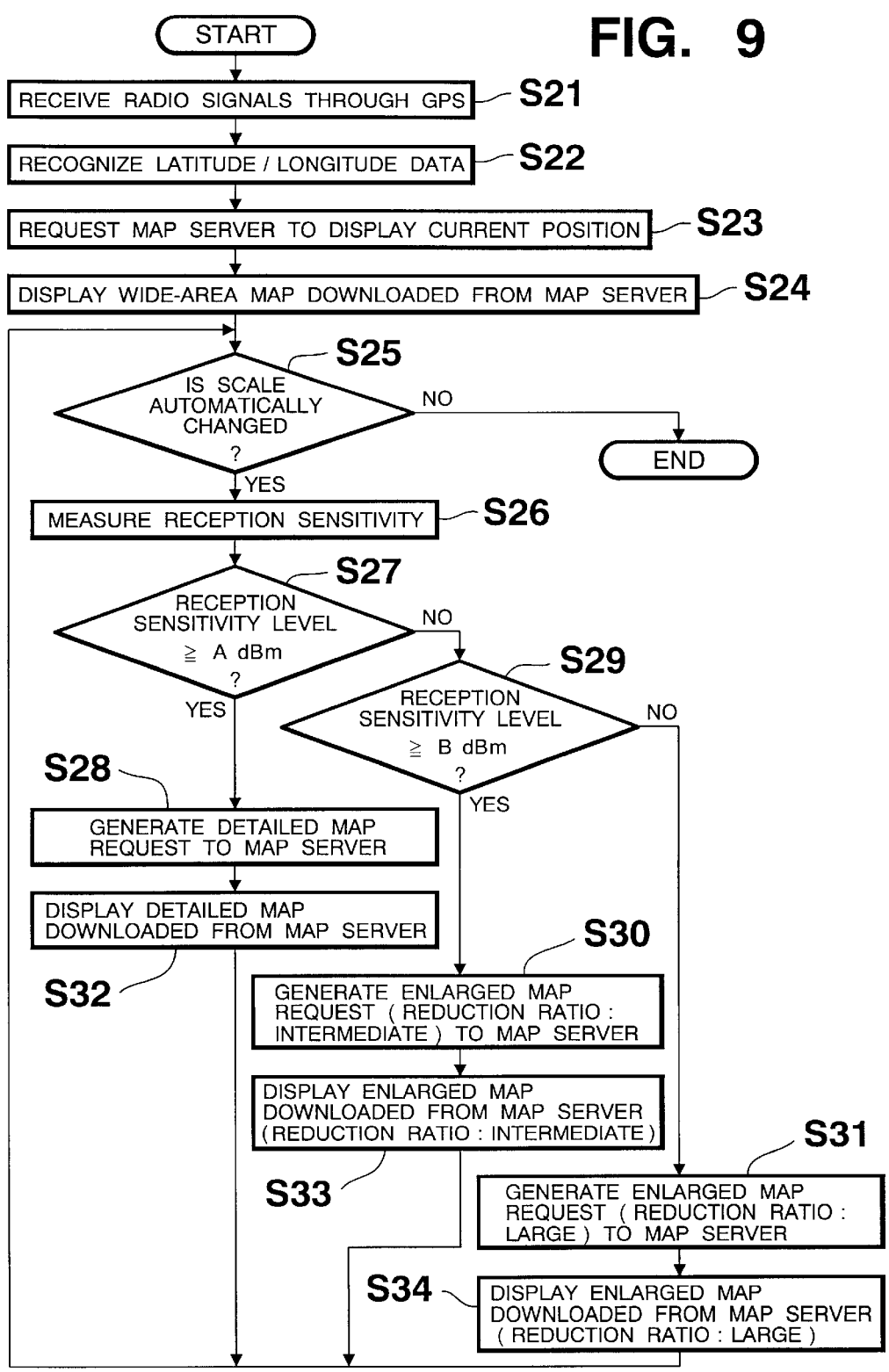
FIG. 9 is a flow chart for explaining the map display operation of the GPS terminal in the position measuring system in FIG. 8.

As shown in FIG. 9, upon recognition of the latitude/longitude data of the GPS terminal 1, the CPU 11 reads out a wide-area map centered on the recognized latitude/longitude data and having a size matching the display area of the LCD 21 from the bitmapped map data stored in the ROM 12.

The CPU 11 instructs the LCD controller 20 to display the wide-area map read out from the ROM 12 on the LCD 21. The LCD controller 20 then causes the LCD 21 to display the wide-area map read out from the ROM 12 (step S4).

If a request to change the reduction ratio of the wide-area map displayed on the LCD 21 is input to the user input section 14 (step S5), the GPS radio section 23 measures reception sensitivity with respect to radio signals in the GPS terminal 1 on the basis of the electric field strength of the radio signals transmitted from the GPS satellites, and transmits the measurement result to the CPU 11 (step S6).

Upon reception of the measurement result on the reception sensitivity with respect to the radio signals from the GPS radio section 23, the CPU 11 checks whether the reception sensitivity level with respect to the radio signals received by the GPS radio section 23 is equal to or higher than A [dBm] (step S7).

If it is determined in step S7 that the reception sensitivity level with respect to the radio signals is equal to or higher than A [dBm], the CPU 11 instructs the LCD controller 20 to cause the LCD 21 to display a detailed map at the smallest reduction ratio. The LCD controller 20 then changes the reduction ratio of the wide-area map displayed on the LCD 21 to the smallest reduction ratio and causes the LCD 21 to display it (step S8).

If it is determined in step S7 that the reception sensitivity level with respect to the radio signals is lower than A [dB], the CPU 11 checks whether the reception sensitivity level with respect to the radio signals is equal to or higher than B [dBm] (step S9).

If it is determined in step S9 that the reception sensitivity level with respect to the radio signals is equal to higher than B [dBm], the CPU 11 instructs the LCD controller 20 to cause the LCD 21 to display a detailed map at an intermediate reduction ratio. The LCD controller 20 then changes the reduction ratio of the wide-area map displayed on the LCD 21 to the intermediate reduction ratio and causes the LCD 21 to display it (step S10).

If it is determined in step S9 that the reception sensitivity level with respect to the radio signals is lower than B [dBm], the CPU 11 instructs the LCD controller 20 to cause the LCD 21 to display a detailed map at the largest reduction ratio. The LCD controller 20 then changes the reduction ratio of the wide-area map displayed on the LCD 21 to the largest reduction ratio and causes the LCD 21 to display it (step S11).

If the map is displayed on the LCD 21 at an arbitrary reduction ratio in one of steps S8, S10, and S11, the flow returns to step S5. While the request to change the reduction ratio of the wide-area map is input through the user input section 14, the reception sensitivity with respect to the received radio signals is periodically measured and determined in the GPS terminal 1. This processing is terminated when the input of the request to change the reduction ratio of the wide-area map through the user input section 14 stops.

In the first embodiment, the base station 2 may be designed to measure reception sensitivity with respect to radio signals received by the GPS radio section 23 in the GPS terminal 1.

In this case, the base station 2 measures reception sensitivity with respect to radio signals in the GPS terminal 1 on the basis of the electric field strength of the radio signals in the GPS terminal 1, which is transmitted from the GPS terminal 1, and transmits the measurement result to the CPU 11 in the GPS terminal 1. The CPU 11 changes the scale of the map displayed on the LCD 21 on the basis of the measurement result on the reception sensitivity with respect to the radio signals in the GPS terminal 1, which is transmitted from the base station 2.

In the first embodiment, the operation to be performed when a map is displayed on the LCD at one of three different reduction ratios has been described. However, the reduction ratio at which a map is displayed on the LCD is not limited to three different reduction ratios.

Figure 5:
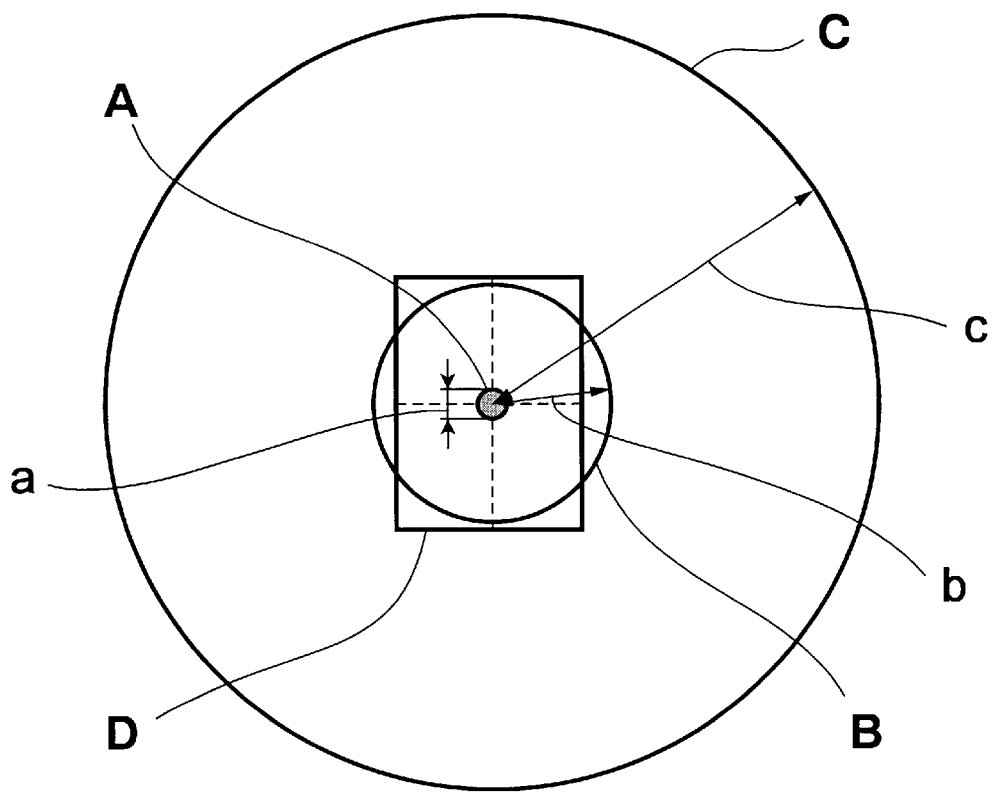
FIG. 5 is a view showing an image when an area with the smallest reduction ratio is displayed in the display area on an LCD in the GPS terminal in FIG. 3.
Figure 6A:
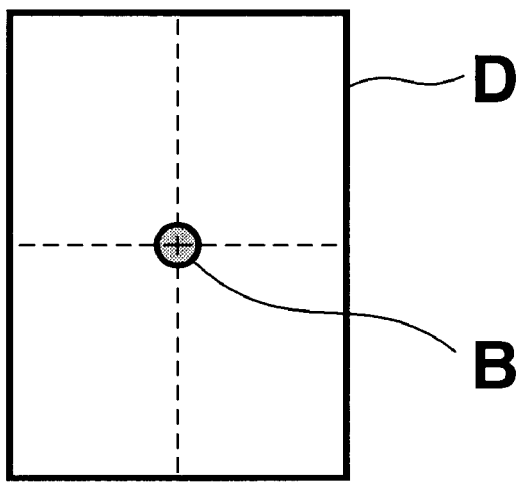
Figure 6B:
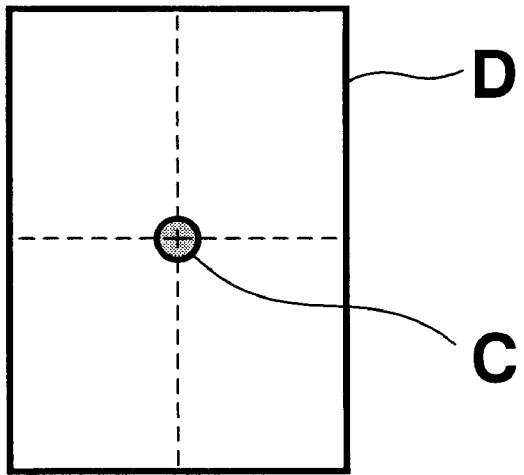

FIG. 5 is a view showing an image when an area with the smallest reduction ratio is displayed on the display area of the LCD in the GPS terminal 1 shown in FIGS. 1 and 2. FIGS. 6A and 6B are views showing images when the display area on the LCD in FIG. 5 is enlarged on the basis of reception sensitivity in the GPS terminal 1 with respect to radio signals transmitted from the GPS satellites. FIG. 6A is a view showing an image when the display area is enlarged to display an area B in FIG. 5. FIG. 6B is a view showing an image when the display area is enlarged to display an area C in FIG. 5.

As shown in FIG. 5, while reception sensitivity in the GPS terminal 1 with respect to the radio signals transmitted from the GPS satellites is good and the position recognition precision is high, an area A within a radius a (several m) is displayed within an area D which is the range in which a map can be displayed on the LCD. Reference symbols b and c respectively denote position recognition precisions corresponding to a radius of several ten m and a radius of several hundred m.

Assume that the reception sensitivity with respect to radio signals deteriorates due to a multi-path effect or the like. In this case, since the position recognition precision deteriorates, the display area D is enlarged on the basis of the reception sensitivity to display the area B with a radius of several ten m or the area C with a radius of several hundred m within the range of the display area D, as shown in FIGS. 6A and 6B.

FIG. 7A to 7C are views respectively showing image windows actually displayed on the display area of the LCD in the GPS terminal 1 shown in FIGS. 1 and 2. FIG. 7A is a view showing an image window to be displayed when the reception sensitivity in the GPS terminal 1 with respect to the radio signals transmitted from the GPS satellites is highest. FIG. 7B is a view showing an image window to be displayed when the reception sensitivity in the GPS terminal 1 with respect to the radio signals transmitted from the GPS satellites deteriorates. FIG. 7C is a view showing an image window to be displayed when the reception sensitivity in the GPS terminal 1 with respect to the radio signals transmitted from the GPS satellites further deteriorates from the state shown in FIG. 7B.

As shown in FIGS. 7A to 7C, the scale of the map in the image window displayed on the LCD is changed on the basis of the reception sensitivity in the GPS terminal 1 with respect to the radio signals transmitted from the GPS satellites.

Second Embodiment

Figure 8:
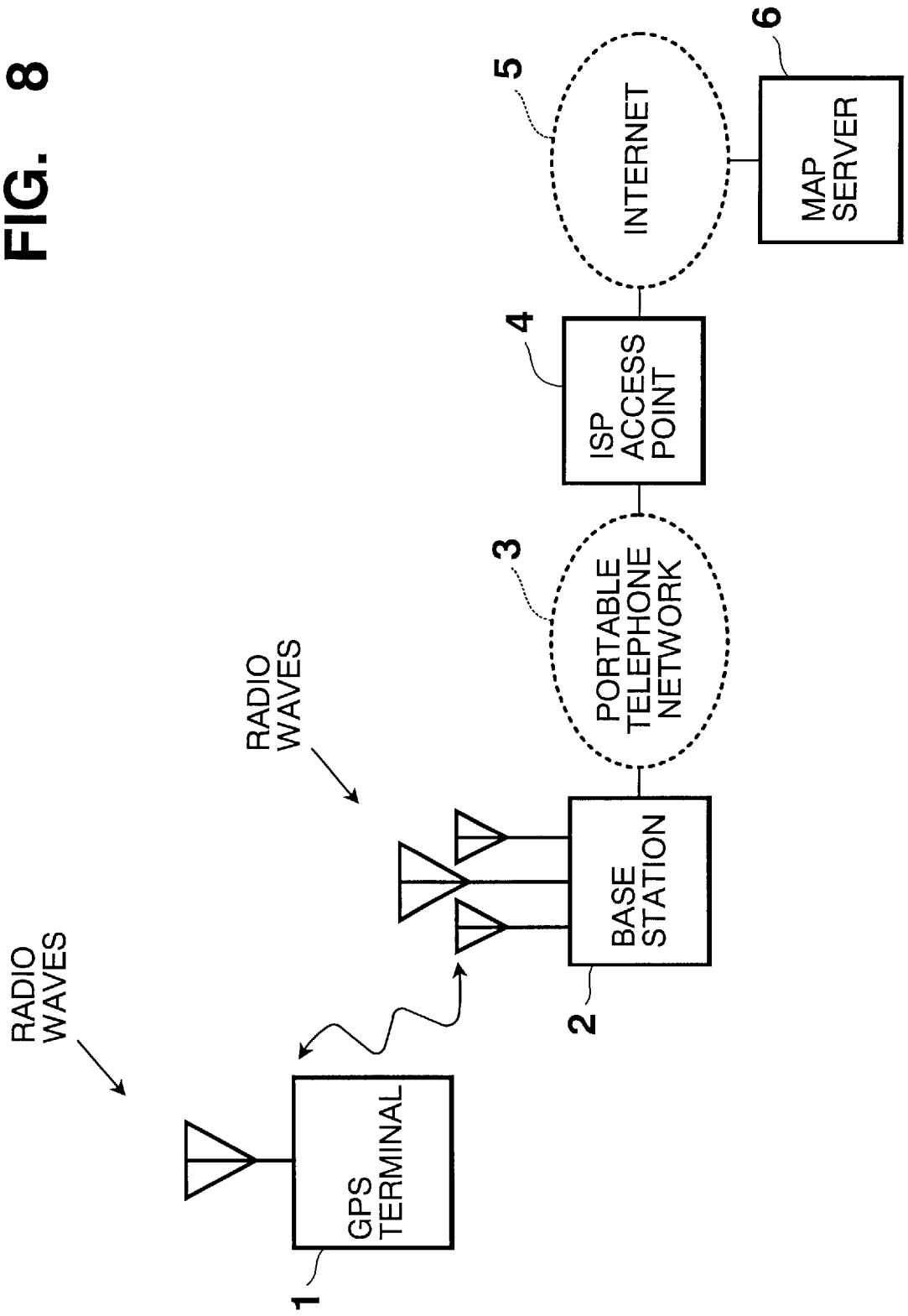
FIG. 8 is a schematic view showing the arrangement of a position measuring system according to the second embodiment of the present invention.

FIG. 8 is a view showing a position measuring system using the GPS terminal shown in FIG. 2 according to the second embodiment.

As shown in FIG. 8, the second embodiment includes a. GPS terminal 1, base station 2, portable telephone network 3, ISP (Internet Service Provider) access point 4, Internet 5, and map server 6.

As compared with the first embodiment described above, the second embodiment is designed such that the GPS terminal 1 is connected to the ISP access point 4 through the base station 2 and portable telephone network 3 to allow access to the Internet 5 or the map server 6 on the Internet 5.

According to the first embodiment described above, only map data stored in the ROM in the GPS terminal is displayed on the GPS terminal. In contrast to this arrangement, in the second embodiment, the GPS terminal is connected to the Internet so that map data stored in a map server on the Internet can be displayed on the GPS terminal.

The map server 6 is a general WEB server connected to the Internet 5, and can transfer a file such as map data according to the HTTP (Hyper Text Transfer Protocol).

The map server 6 holds map data which is more detailed than the map data stored in the ROM in the GPS terminal 1. This detailed map data is held in the bitmap format like the map data stored in the ROM in the GPS terminal 1.

The map display operation of the GPS terminal in the position measuring system having the above arrangement will be described in detail below with reference to the flow chart of FIG. 9.

FIG. 9 is a flow chart for explaining the map display operation of the GPS terminal 1 in FIG. 8. Assume that a map is displayed on the LCD at one of three different reduction ratios on the basis of reception sensitivity in the GPS terminal 1 with respect to radio signals transmitted from GPS satellites. If the reception sensitivity is equal to or more than A [dBm], the map is displayed at the smallest reduction ratio. When the reception sensitivity is in the range of [dBm] (inclusive) to A [dBm] (exclusive), the map is displayed at an intermediate reduction ratio. When the reception sensitivity is less than B [dBm], the map is displayed at the largest reduction ratio.

The operation in steps S21 and S22 in FIG. 9 is the same as that in steps S1 and S2 in FIG. 3, and hence a detailed description thereof will be omitted. Operation to be performed after the CPU in the GPS terminal 1 recognizes the latitude/longitude data of the GPS terminal 1 owing to the base station 2 will be described below.

When a request to display the current position is input to a user input section in the GPS terminal 1, the CPU in the GPS terminal 1 transmits the latitude/longitude data recognized in step S22 to the map server 6, and a request to display a wide-area map centered on the latitude/longitude data is generated (step S23).

Subsequently, the CPU in the GPS terminal 1 downloads a wide-area map centered on the latitude/longitude data recognized in step S22 from the map data held in the map server 6 in advance. Thereafter, the wide-area map downloaded from the map server 6 is displayed on the LCD in the GPS terminal 1 (step S24).

If a request to change the reduction ratio of the wide-area map displayed on the LCD is input through the user input section in the GPS terminal 1 (step S25), the GPS radio section in the GPS terminal 1 measures reception sensitivity in the GPS terminal 1 with respect to radio signals on the basis of the electric field strength of the radio signals transmitted from the GPS satellites, and transmits the measurement result to the CPU in the GPS terminal 1 (step S26).

The CPU in the GPS terminal 1 checks whether the reception sensitivity level with respect to the radio signals is equal to or higher than A [dBm] (step S27). If it: is determined that the reception sensitivity level is equal to or higher than A [dBm], a request for a detailed map with the smallest reduction ratio is sent to the map server 6 (step S28).

The CPU in the GPS terminal 1 downloads the detailed map with the smallest reduction ratio which is centered on the latitude/longitude data recognized in step S22 from the map data held in the map server 6 in advance. Thereafter, the detailed map downloaded from the map server 6 is displayed on the LCD in the GPS terminal 1 (step S32).

If it is determined in step S27 that the reception sensitivity level with respect to the radio signals is lower than A [dBm], the CPU in the GPS terminal 1 checks whether the reception sensitivity level with respect to the radio signals is equal to or higher than B [dBm] (step S29). If it is determined that the reception sensitivity level is equal to or higher than B [dBm], a request for a detailed map with an intermediate reduction ratio is sent to the map server 6 (step S30).

The CPU in the GPS terminal 1 then downloads the detailed map with the intermediate reduction ratio which is centered on the latitude/longitude data recognized in step S22 from the map data held in the map server 6 in advance. Thereafter, the detailed map downloaded from the map server 6 is displayed on the LCD in the GPS terminal 1 (step S33).

If it is determined in step S29 that the reception sensitivity with respect to the radio signals is lower than B [dBm], the CPU in the GPS terminal 1 sends a request for a map with the largest reduction ratio to the map server 6 (step S31).

The CPU in the GPS terminal 1 then downloads the detailed map with the largest reduction ratio which is centered on the latitude/longitude data recognized in step S22 from the map data held in the map server 6 in advance. Thereafter, the detailed map downloaded from the map server 6 is displayed on the LCD in the GPS terminal 1 (step S34).

If the detailed map with an arbitrary reduction ratio is displayed on the LCD in one of steps S32 to S34, the flow returns to step S25. While the request to change the reduction ratio of the wide-area map is input through the user input section, the reception sensitivity with respect to the received radio signals is periodically measured and determined. When the input of the request to change the reduction ratio of the wide-area map through the user input section stops, the processing is terminated.

In the second embodiment, the base station 2 may be designed to measure reception sensitivity with respect to radio signals transmitted from GPS satellites and received by the GPS terminal 1.

In this case, the base station 2 measures reception sensitivity in the GPS terminal 1 with respect to radio signals on the basis of the electric field strength of the radio signals in the GPS terminal 1, which is transmitted from the GPS terminal 1, and transmits the measurement result to the CPU in the GPS terminal 1. The CPU changes the reduction ratio of the map displayed on the LCD on the basis of the measurement result on the reception sensitivity in the GPS terminal 1 with respect to the radio signals, which is transmitted from the base station 2.

As in the first embodiment, in the second embodiment, the operation to be performed when a map is displayed on the LCD at one of three different reduction ratios has been described. However, the reduction ratio at which a map is displayed on the LCD is not limited to the three different reduction ratios.

In the second embodiment, the base station 2 may be designed to request the map server 6 to change the reduction ratio of a wide-area map displayed on the LCD in the GPS terminal. In this case, a request for a detailed map obtained by scaling down a wide-area map is sent to the map server 6, and the requested detailed map is downloaded from the map server 6 into the GPS terminal 1.

In general, a detailed map is required for an urban area, whereas a less detailed map will suffice for a mountainous area. For this reason, in this embodiment, the reduction ratio of a detailed map to be downloaded from the map server changes depending on the area.

The ratio between the scale of a map stored in the ROM in the GPS terminal and the scale of a detailed map to be downloaded from the map server changes depending on the area.

Third Embodiment

Figure 10:
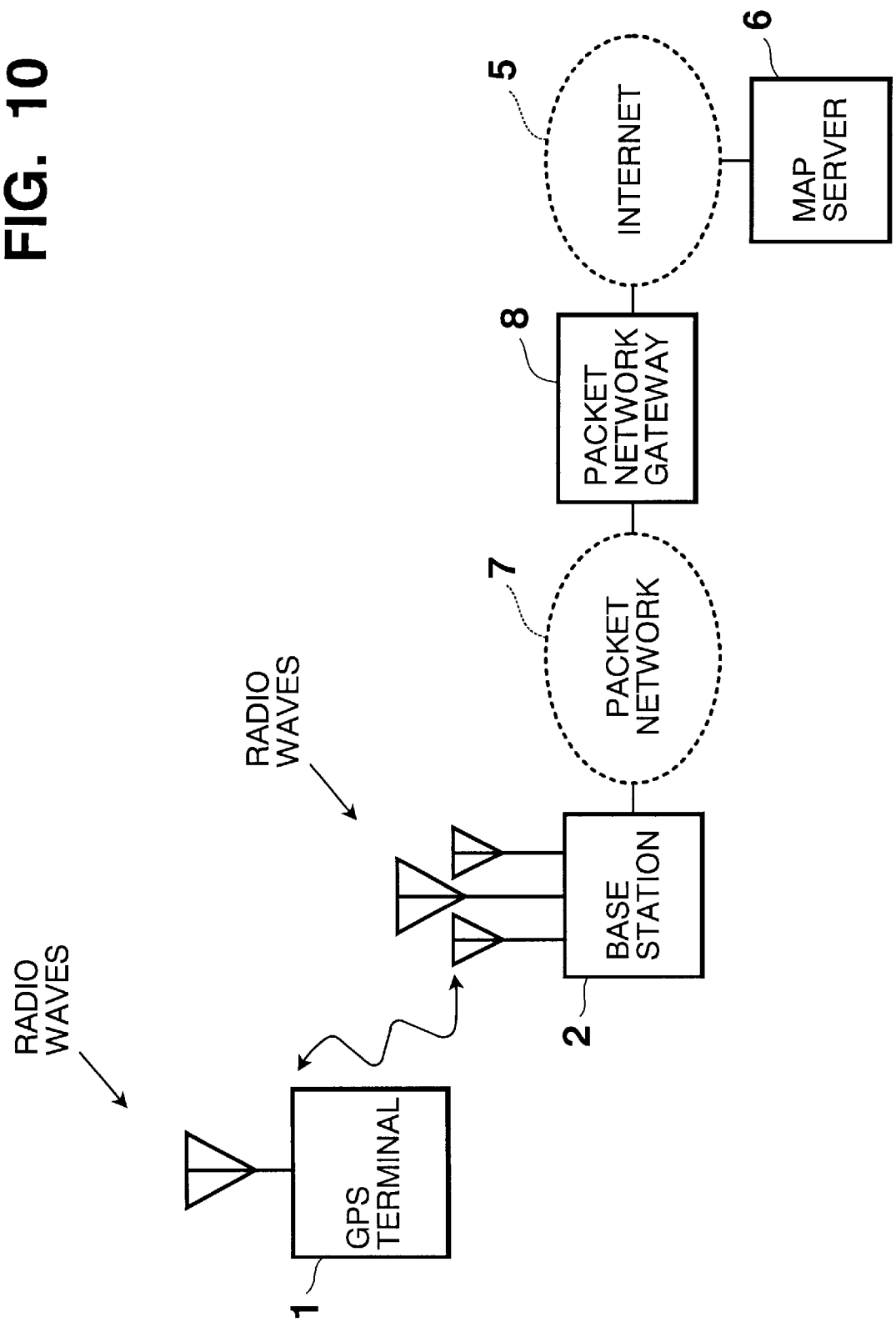
FIG. 10 is a schematic view showing the arrangement of a position measuring system according to the third embodiment of the present invention.

FIG. 10 is a view showing a position measuring system using the GPS terminal shown in FIG. 2 according to the third embodiment.

As shown in FIG. 10, as compared with the second embodiment, in the third embodiment, the arrangement in which the GPS terminal 1 accesses the Internet 5 through the base station 2 is changed from the arrangement for making access through an ISP access point upon line connection using a portable telephone network into an arrangement for making access through a packet network 7 and packet network gateway 8.

The third embodiment allows a GPS terminal to access the Internet by using a packet switching service using portable telephone radio infrastructure that has recently been put into practice.

The third embodiment differs from the second embodiment only in the Internet access means. Other arrangements and operations are the same as those of the second embodiment, and hence a detailed description thereof will be omitted.

As has been described above, according to the present invention, a bitmap format has been described as the map format. However, a characteristic feature of the present invention is that the scale of a map to be displayed is automatically changed on the basis of reception sensitivity with respect to radio signals received by using a GPS, and hence the map format is not specifically limited. For example, a vector format may be used. According to this vector format, information about roads and geographic features is held as a set of lines based on coordinate data.

In the present invention, a GPS terminal equipped with a network-dependent GPS has been exemplified. However, the present invention can also be applied to a general GPS terminal singly using a GPS independent of a network.

According to the present invention, since the scale of a map to be displayed is automatically changed on the basis of reception sensitivity in a GPS terminal with respect to radio signals transmitted from GPS satellites, the recognition precision of the current position of the GPS terminal improves due to improved reception sensitivity when the user changes the reception condition and the like for radio signals.

What is claimed is:

1. A GPS terminal comprising reception means, equipped with a GPS, for receiving radio signals transmitted from a plurality of artificial satellites, control means for recognizing latitude/longitude data of a current position on the basis of the radio signals received by said reception means, and display means for displaying a map centered on the latitude/longitude data recognized by said control means,
   wherein said reception means measures reception sensitivity with respect to the radio signals transmitted from the plurality of artificial satellites, and
   said control means automatically changes a scale of the map displayed by said display means on the basis of the measurement result on the reception sensitivity in said reception means with respect to the radio signals.

2. A terminal according to claim 1, wherein
   said reception means measures reception sensitivity with respect to radio signals transmitted from the plurality of artificial satellites upon reception of a request to scale down the map displayed by said display means, and
   said control means automatically changes the scale of the map displayed by said display means on the basis of the measurement result on the reception sensitivity in said reception means with respect to the radio signals.

3. A GPS terminal comprising reception means, equipped with a GPS capable of network communication, for receiving radio signals transmitted from a plurality of artificial satellites, communication means for receiving latitude/longitude data of a current position by network communication with a base station, control means for recognizing the latitude/longitude data of the current position on the basis of the radio signals received by said reception means and the latitude/longitude data received by said communication means, and display means for displaying a map centered on the latitude/longitude data recognized by said control means,
   wherein said reception means measures reception sensitivity with respect to the radio signals transmitted from the plurality of artificial satellites, and
   said control means automatically changes a scale of the map displayed by said display means on the basis of the measurement result on the reception sensitivity in said reception means with respect to the radio signals.

4. A terminal according to claim 3, wherein
   said reception means measures reception sensitivity with respect to radio signals transmitted from the plurality of artificial satellites upon reception of a request to scale down the map displayed by said display means, and
   said control means automatically changes the scale of the map displayed by said display means on the basis of the measurement result on the reception sensitivity in said reception means with respect to the radio signals.

5. A terminal according to any one of claims 1 to 4, wherein
   said terminal further comprises storage means for storing a wide-area map in advance, and
   said control means displays the wide-area map stored in said storage means upon changing a scale of the wide-area map on the basis of the measurement result in said reception means with respect to the radio signals.

6. A terminal according to claim 3 or 4, wherein said control means accesses the Internet through said communication means and the base station, downloads a map whose scale is changed from a map server on the Internet on the basis of the measurement result on the reception sensitivity in said reception means with respect to the radio signals, and displays the map on said display means.

7. A map display method using the GPS terminal defined in claim 5, comprising the steps of:
   causing the reception means to measure reception sensitivity with respect to radio signals transmitted from the plurality of artificial satellites upon reception of a request to scale down the map displayed by the display means; and
   causing the control means to display the wide-area map stored in the storage means upon changing the scale of the map on the basis of the measurement result on the reception sensitivity in the reception means with respect to the radio signals.

8. A position measuring system comprising a base station which is equipped with a GPS capable of network communication and receives radio signals transmitted from a plurality of artificial satellites, and a GPS terminal which is equipped with a GPS capable of network communication, receives radio signals transmitted from the plurality of artificial satellites, recognizes latitude/longitude data of a current position by performing network communication with said base station, and displays a map centered on the latitude/longitude data, wherein said GPS terminal measures reception sensitivity with respect to the radio signals transmitted from the plurality of artificial satellites, and automatically changes a scale of the displayed map on the basis of the measurement result.

9. A system according to claim 8, wherein said GPS terminal comprises:

reception means for receiving radio signals transmitted from a plurality of artificial satellites and measuring reception sensitivity with respect to the radio signals transmitted from the plurality of artificial satellites;

communication means for receiving latitude/longitude data of a current position of said GPS terminal by performing network communication with said base station;

control means for recognizing the latitude/longitude data of the current position on the basis of the radio signals received by said reception means and the latitude/longitude data received by said communication means; and display means for displaying a map centered on the latitude/longitude data recognized by said control means, and said control means automatically changes a scale of the map displayed by said display means on the basis of the measurement result in said reception means with respect to the radio signals.

10. A terminal according to claim 9, wherein said reception means measures reception sensitivity with respect to radio signals transmitted from the plurality of artificial satellites upon reception of a request to scale down the map displayed by said display means, and said control means automatically changes the scale of the map displayed by said display means on the basis of the measurement result on the reception sensitivity in said reception means with respect to the radio signals.

11. A position measuring system comprising a base station which is equipped with a GPS capable of network communication and receives radio signals transmitted from a plurality of artificial satellites, and a GPS terminal which is equipped with a GPS capable of network communication, receives radio signals transmitted from the plurality of artificial satellites, recognizes latitude/longitude data of a current position by performing network communication with said base station, and displays a map centered on the latitude/longitude data, wherein said base station measures reception sensitivity in said GPS terminal with respect to the radio signals transmitted from the plurality of artificial satellites, and transmits the measurement result to said GPS terminal, and said GPS terminal automatically changes a scale of the displayed map on the basis of the measurement result on the reception sensitivity in said GPS terminal with respect to the radio signals, which is transmitted from said base station.

12. A system according to claim 10, wherein said GPS terminal comprises:

reception means for receiving radio signals transmitted from a plurality of artificial satellites;

communication means for receiving latitude/longitude data of a current position of said GPS terminal by performing network communication with said base station;

control means for recognizing the latitude/longitude data of the current position on the basis of the radio signals received by said reception means and the latitude/longitude data received by said communication means;

display means for displaying a map centered on the latitude/longitude data recognized by said control means, said communication means receives the measurement result on the reception sensitivity in said reception means with respect to the radio signals, which is transmitted from said base station, and said control means automatically changes the scale of the map displayed by said display means on the basis of the measurement result on the reception sensitivity in said reception means with respect to the radio signals, which is received by said communication means.

13. A system according to claim 12, wherein said communication means receives the measurement result on the reception sensitivity in said reception means with respect to the radio signals from the plurality of artificial satellites, which is transmitted from said base station, upon reception of a request to scale down the map displayed by said display means, and said control means automatically changes the scale of the map displayed by said display means on the basis of the measurement result on the reception sensitivity in said reception means with respect to the radio signals, which is received by said communication means.

14. A system according to any one of claims 9, 10, 12, and 13, wherein said GPS terminal comprises storage means for storing a wide-area map in advance, and said control means displays the wide-area map stored in said storage means upon changing a scale of the wide-area map on the basis of the measurement result on the reception sensitivity in said reception means with respect to the radio signals transmitted f from the plurality of artificial satellites.

15. A map display method using the position measuring system defined in claim 14, comprising the step of causing the control means to display the wide-area map stored in the storage means upon changing the scale of the map on the basis of the measurement result on the reception sensitivity in the reception means with respect to the radio signals transmitted from the plurality of artificial satellites.

16. A system according to any one of claims 9, 10, 12, and 13, wherein said control means accesses the Internet through said communication means and the base station, downloads a map whose scale is changed from a map server on the Internet on the basis of the measurement result on the reception sensitivity in said reception means with respect to the radio signals transmitted from the plurality of artificial satellites, and displays the map on said display means.

17. A map display method using the position measuring system defined in claim 16, comprising the step of causing the control means to access the Internet through the communication means and the base station, download a map whose scale is changed from a map server on the Internet on the basis of the measurement result on the reception sensitivity in the reception means with respect to the radio signals transmitted from the plurality of artificial satellites, and display the map on the display means.

18. A map display method using the GPS terminal defined in claim 6, comprising the steps of:

causing the reception means to measure reception sensitivity with respect to radio signals transmitted from the plurality of artificial satellites upon reception of a request to scale down the map displayed by the display means; and causing the control means to access the Internet through the communication means and the base station, download a map whose scale is changed from a map server on the Internet on the basis of the measurement result on the reception sensitivity in the reception means with respect to the radio signals, and display the map on the display means.

* * * * *